United States Patent Office 3,242,244
Patented Mar. 22, 1966

3,242,244
EXTRUSION OF EPOXY RESIN
George P. Maly, Fullerton, Calif., assignor to Union Oil Company of California, Los Angeles, Calif., a corporation of California
No Drawing. Filed May 11, 1964, Ser. No. 366,608
9 Claims. (Cl. 264—83)

This application is a continuation-in-part of my copending application Serial No. 1,437, filed January 11, 1960, now U.S. Patent No. 3,139,657.

This invention relates to a method for extruding epoxy resins, and in particular concerns a method for hardening extruded epoxy resins with a gaseous curing agent.

Extrusion of plastics into shaped objects, e.g., fibers and films, by forcing the plastic through a die is a well established procedure. However, heretofore, extrusion procedures have been substantially limited to use of thermoplastics such as cellulose acetate, polyamides, polyethylene, polystyrene, acrylates, polyesters, etc., since these thermoplastics maintain high strength during extrusion and rapidly solidify after extrusion to yield tackless products. While thermosetting plastics such as epoxy resins have excelllent physical, chemical and electical properties for fibers and films, methods for extruding these plastics have heretofore proven unsuccessful because they lack the aforementioned characteristics of thermoplastics which are necessary for extrusions.

It is accordingly an objective of this invention to provide a method for extrusion of plastics.

It is an additional object of this invention to provide a method for extrusion of epoxy resin plastics.

Still other objects of the invention will become apparent to those skilled in the art as the invention is better understood by reference to the detailed description appearing hereinafter.

I have discovered that the aforementioned objects can be achieved by extruding a liquid epoxy resin into contact with a gaseous curing agent. When epoxy resin extrusion products having substantial thickness are to be formed, a complexing agent for the gaseous curing agent can be incorporated into the resin before or during extrusion.

In its simplest embodiment, my invention comprises a method for extruding epoxy resins which comprises extruding the epoxy prepolymer admixed with a complexing agent for the curing agent through a shaping die into a product such as a fiber or film and contacting the resulting product with a gaseous curing agent. In another embodiment, a diluent or filler can be mixed with the epoxy prepolymer. Still another embodiment of my invention comprises a method for coating filaments by extruding an epoxy prepolymer onto a filament, such as a fiberglass fiber or metal strand, and thereafter contacting the extrusion coating with a gaseous curing agent to cure harden the epoxide prepolymer into a hardened resin on the filament.

Epoxide resins have obtained a prominent place in various arts. These resins are formed by cure hardening of epoxy ether condensation prepolymers having the general formula:

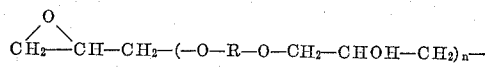
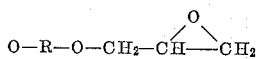

where $n$ represents a number (0, 1, 2, 3, etc.) and R represents the divalent radical of a polyhydroxide compound, such as glycerine, propylene glycol, hydroxyphenol, dihydroxybenzophenone, bis-(4-hydroxyphenyl)-2,2 propane ("bis-phenol-A"), bis-(4-hydroxyphenyl)-2,2 butane, bis-(4-hydroxyphenyl)-4,4 pentanoic acid ("diphenolic acid"), tetrachlorobisphenol-A, etc. These products are obtained commercially by condensing epichlorohydrin with one of the aforesaid polyhydroxy compounds, usually bis-phenol-A. The value of $n$ is determined by the relative concentration of epichlorohydrin reactant to the polyhydroxy compound; the greater the concentration of epichlorohydrin, the lower the value of $n$. The value of $n$ determines many of the characteristics of the ether polymer, e.g., the prepolymer is liquid at room temperatures for values of $n$ between 0 and about 3 and solid for values of $n$ greater than about 3. The physical properties of the final hardened resins are also determined by the value of $n$, for the greater the value of $n$, the greater the crosslinking in the resin and hence the greater the strength and durability of the hardened resin.

Other epoxides readily available and similarly suited for use in this invention, either alone or in combination with the aforementioned ether condensation polymers, are styrene oxide, butadiene dioxide, the mono-oxide and dioxide of vinyl cyclohexane, 4-epoxy-6-methylcyclohexanecarboxylate, and epoxides obtained by action of peracetic acid and the like or such unsaturates as soybean oil, butyloleate, etc.

The condensation reaction whereby the epoxide prepolymer is hardened does not occur spontaneously, i.e., it requires initiation by heating and/or contacting with a condensation catalyst or curing agent. Conventionally, the prepolymerized resins are marketed as liquid compositions comprising the partially condenser resin and a curing agent, with the final cure to solid resin form being effected at the time of use by heating a mixture of the components to a moderately elevated temperature. However, the curing agents which are so employed have a certain degree of activity at ambient temperatures and consequently such compositions slowly harden during storage, i.e., they have finite shelf life.

I have found that if contacted with a sufficiently active gaseous curing agent, the epoxy resin composition can be immediately cured or hardened at ambient temperatures. My invention utilizes this discovery to provide an extremely rapid hardening of the epoxy prepolymer as the latter is extruded from an extrusion die. In this manner, epoxy prepolymers can be blended with diluents or other agents hereafter specified to impart the optimum properties for extrusion and rapid hardening to tackless solids can be accomplished by contact with the gaseous curing agent as the resin is extruded.

The gaseous curing agents which can be used in my invention are any of the gaseous Lewis acids, i.e., compounds which are gases at ambient conditions and capable of accepting electrons to form a compound with coordinate covalent bonds. Among these agents are the following: halogens such as fluorine, chlorine, bromine; hydrogen halides such as hydrogen fluoride, hydrogen chloride, hydrogen bromide, hydrogen iodide, etc.; gaseous boron halogen compounds such as boron trichloride, boron trifluoride, boron monochloride pentahydride, boron monobromide pentahydride, etc.; gaseous silica halogen compounds such as silicon fluoride, trifluorosilicane, chlorosilicane, etc.; nitrogen oxides such as nitrogen dioxide, nitrogen tetraoxide, nitrogen pentaoxide, nitrogen trioxide. These materials are highly active as curing agents at ambient temperatures. If desired their activity can be moderated by admixing them with an inert gas such as nitrogen, carbon dioxide, etc. The use of a diluent gas is preferred with the extremely active curing agent to avoid overheating and damage to the resin.

When epoxy resin extrusions having substantial thickness are contacted with gaseous curing agents, the ensuing resin cure is so rapid that an impermeable layer of cured resin (approximately 0.001 inch) is formed on the exposed surface of the extrusion and further penetration of the gas to the uncured resin below this film is impossible. However, I have found that the gaseous curing agent can be induced to penetrate to greater depths by admixing a complexing agent, i.e., a compound which donates a pair of electrons to form a compound having a coordinate covalent bond with said gaseous curing agent, with the resin prior to extrusion. Materials which are suitable as complexing agents and which are employed in accordance with this invention are compounds classified as Lewis bases or electron donors, i.e., electrons are available to be shared with the Lewis acid type gaseous curing agents. Preferably compounds having from 1 to 20 and most preferably 1 to 10 carbons are used. Examples of such complexing agents are: alkyl and cyclo-alkyl amines such as trimethylamine, ethylmethylamine, t-butylamine, methylamine, n-hexylamine, 2-ethylmethylaminopentane, etc.; aryl amines such as aniline, diphenylamine, triphenylamine, etc.; heterocyclic amines such as pyridine, 2-picoline, 2-ethylpyridine, 2,4-dimethyl quinoline, cinnoline, etc.; alkyl ethers such as ethyl ether, diethyl ether, ethyl-n-propyl ether, di-n-propyl ether, butyl ether, di-n-octyl ether, etc.; heterocyclic ethers such as 1,4-dioxane, 1,3-dioxane, etc.; aryl ethers such as ethylphenyl ether, butylphenyl ether, ethyloctylphenyl ether, etc.; alkyl and aralkyl ketones such as methyl ethyl ketone, acetone, benzyl acetone, butylphenyl ketone, amylethyl ketone, ethylheptyl ketone, etc.; esters of aliphatic acids and alcohols such as ethyl acetate, methyl benzoate, propyl formate, n-propyl-isobutyrate, methyl hydrogen succinate, cyclohexyl benzoate, etc.; aromatic and aliphatic acid anhydrides such as acetic anhydride, phthalic anhydride, benzoic anhydride, glutaric anhydride, valeric anhydride, pentanoic anhydride, methylethyl acetic anhydride, etc.; aliphatic alcohols such as methyl alcohol, ethylene glycol, 1-pentanol, 3-pentanol, 2-methyl-1-butanol, 3-methyl-1-butanol, etc.; aliphatic and aromatic acids such as acetic, propionic, butyric, valeric, lauric, oleic, stearic, benzoic, etc.; dibasic aliphatic acids such as adipic, phthalic, glutaric, malonic, succinic, etc.

When complexing agents of the aforementioned type are incorporated into epoxy resins and are subsequently contacted with a gaseous curing agent, the gaseous agent penetrates into the resin to depths much greater than is possible without the use of said complexing agent. When excessive amounts of complexing agent are used however, the polymerized epoxy resin tends to be soft and loose some of its strength. Accordingly, I use from 0.1 to 25 weight percent complexing agent in the resin, preferably from 0.2 to 10 weight percent, and most preferably from 0.5 to 4 weight percent.

It is also within the scope of my invention to incorporate boron trifluoride complexes into the epoxy prepolymer prior to its extrusion. The prepolymer is then forced through a die and the extrusion produced is contacted with a gaseous curing agent. The outer surface of the extrusion product is immediately cure hardened to form a shell around uncured polymer by contact with the gaseous curing agent. This outer shell which can comprise from about 25 to 90 percent of the fiber thickness imparts sufficient strength to the extruded product to permit handling. The product is then heated to the necessary release temperature, e.g., 80° to 250° C. to release the boron trifluoride from the complex and cure harden the core. The thickness of the shell can vary from about 0.001 when none of the aforementioned complexes are compounded with the prepolymer prior to extrusion to about 0.1 inch or greater by the addition of any of the aforementioned complexing agents. Examples of such compounds are boron trifluoride dimethylformamide, boron trifluoride aniline, boron trifluoride pyridine, boron trifluoride tetrahydrofuran, boron trifluoride dimethylsulfoxide, boron trifluoride diphenylamine, boron trifluoride trimethylamine, boron trifluoride monoethylamine, boron trifluoride monocyclohexylamine, etc.

As previously mentioned, the epoxy prepolymer should have the proper viscosity or flow characteristics to readily flow through an extruding die. Also, the extruded product must be sufficiently strong to maintain its form until it is completely polymerized. The aforementioned viscosity can be obtained with the use of a diluent or a filler. For example, epoxy prepolymers that are solid can be dissolved in suitable low viscosity diluents to achieve the desired viscosity; or to impart thixotropic properties to a low viscosity liquid resin, a filler material can be incorporated into the liquid prior to extrusion.

The following diluents can be used in the practice of my invention: phenyl glycidyl ether, butyl glycidyl ether, octylene oxide, styrene oxide, xylene, epichlorohydrin, propylene oxide, etc. Diluents are preferably mixed with the prepolymerized epoxy resin in quantities as small as possible to avoid loss of strength and solvent resistance in the cured resin. Generally, diluents in amounts from 5 to 35 parts per 100 parts of resin can be used and preferably, 5 to 10 parts per 100 parts resin.

A solid filler can also be incorporated in the liquid prepolymer to impart the thixotropic properties to said resin or to lower the cost of the resin that is to be extruded. Such filler also alters the resin's physical properties, e.g., the solid filler lowers the resin's coefficient of thermal expansion, reduced its shrinkage, increases its thermal conductivity, alters its hardness, increases its dielectric strength, reduces the exotherm experienced on curing, etc.

Generally, any finely divided solid that is inert to the resin can be used. Preferably the solid should be dried before use to avoid introducing water that will weaken the resin. Several well known filling agents are listed as follows: clays such as bentonite, montronillonite, kaolin, vermiculite, asbestos, albalith, silica, mica, flint powder, quartz, kryolite, Portland cement, limestone, aluminum powder, silver powder, powdered glass, silicon dioxide, aluminum oxide, etc. Generally, particulate filler material can be used in the range of 5 millimicron to 100 microns and preferably 10 millimicrons to 10 microns. Fillers can be incorporated in the epoxy prepolymer in amounts from 0.5 to 60 percent by weight and preferably, 1.0 to 10 percent by weight.

It is also within the scope of my invention to add a solid organic resin to the epoxy prepolymer prior to extrusion. Various thermosetting resins can be added to the epoxy prepolymer to modify the properties of the cured resin. Thus, phenolic resins, e.g., phenol-formaldehyde, phenol-furfural, etc., may be used to increase heat distribution temperatures of some systems. Still other resins such as melamine-formaldehyde, urea-formaldehyde, polyamides, etc., can be used to impart flexibility, high impact strength and greater thermal shock resistance to the cured resin. In general, the best results are obtained with resins which actually react, at least to some degree, with the epoxy resin.

In practicing my invention, a liquid epoxy prepolymer is extruded through a shaping die whereupon the resulting extrusion product is contacted with a gaseous curing agent. A complexing agent is mixed with the epoxy resin when it is desired to form extrusion products having substantial thickness. Fillers or diluents in the aforementioned amounts can also be added as desired. Usually, but not necessarily, the gaseous curing agents are employed at ambient temperatures. When extremely active curing agents are employed, they can be cooled below ambient temperatures to avoid overheating of the resin by the exothermic heat release of curing. When the less active gaseous curing agents are employed, they can be heated slightly above ambient temperatures to initiate the reaction. When a boron trifluoride complex is mixed with the epoxy prepolymer, the extrusion produce can be passed through an oven at a temperature of 50–300° C. after the product is contacted with the gaseous curing agent so as to complete cure hardening of the resin core.

It is also within the scope of my invention to extrude an epoxy propolymer on a filament such as wire or glass and standard extrusion coating machines can be used for this coating. In this method, the filament and prepolymer are passed through the die which extrudes an outer coating of the resin on the filament. The die swedges the enveloping resin coating onto the filament and forms the outer diameter as both filament and resin are forced or drawn through the die. Single and multiple strand filaments can be coated in this manner. After the filament has been coated with epoxy resin, it is contacted with the gaseous curing agent which causes immediate cure hardening of the resin.

The epoxy resins of my invention can be extruded at ambient temperatures with any pressure type extrusion system, e.g., a screw system or a spinneret system. In the screw system, mechanical transmitted force from the screw is used to extrude the resin through the die while in the spinneret system hydraulic force from a pump extrudes liquid resin through a metal die, or spinneret, which has a multiplicity of tiny holes. The strands of material coming through the holes are passed into contact with the gaseous curing agent whereupon they form extremely fine filaments. The contacting with the gaseous curing agent can be effected simply by extruding the resin into a chamber filled with the gas or a stream of the gas can be passed over the resin as it exits from the die.

The following examples will illustrate a mode of practice of my invention and demonstrate the results obtainable thereby:

Example 1

A mixture containing 100 parts of the condensation product of epichlorohydrin and bis-phenol-A compounded with 25 parts of 1,4-dioxane and 1 part flameblown silica was extruded through a die to form a fiber having a diameter of about 0.02 inch. This fiber was then drawn through a gas chamber filled with boron trifluoride gas. Upon contacting the gas, the epoxy fiber polymerized through its entire diameter to form a solid cross-linked resin fiber.

Example 2

The procedure of Example 1 was repeated with the exception that boron trichloride was used as the gaseous curing agent rather than boron trifluoride. The extruded epoxy fiber was polymerized through its entire diameter upon contacting the boron trichloride to form a solid cross-linked resin fiber.

Example 3

To 100 parts prepolymerized epichlorohydrin bis-phenol-A were added 10 parts flameblown silica gel filler to form a filled liquid epoxy prepolymer. The liquid mixture was extruded to form a fiber having a diameter about 0.05 inch and then drawn through a chamber filled with boron trifluoride gas. Upon contacting the gas, the surface of the fiber instantaneously polymerized to form a film that was impermeable to the passage of boron trifluoride into the fiber. The resulting fiber was rather weak in that it contained a center core of uncured epoxy resin.

Example 4

The procedure of Example 3 was repeated with the exception that a fiber was drawn to a diameter of about 0.001 inch. Upon contact with boron trifluoride, the entire fiber polymerized to form a solid cross-linked resin fiber.

Example 5

A mixture containing 100 parts of the condensation product of epichlorohydrin and bis-phenol-A compounded with 25 parts of 1,4-dioxane and 1 part flameblown silica was extruded onto a clean glass fiber to form an epoxy coated glass fiber having a diameter of about 0.02 inch. This fiber was then drawn through a gas chamber filled with boron trifluoride gas. Upon contacting the gas, the fiber polymerized through its entire diameter to form a solid cross-linked epoxy resin coated glass fiber.

Example 6

An epoxy resin, epichlorohydrin bis-phenol-A, was extruded upon a clean glass fiber to form an epoxy coated glass fiber having a diameter of about 0.01 inch. This fiber was drawn through a gas chamber filled with boron trifluoride gas. Upon contacting the gas, the surface of the epoxy coating on the glass fiber polymerized to form a film that was impermeable to the passage of boron trifluoride into the fiber to polymerize the resin contacting the glass fiber.

Example 7

The procedure of Example 6 was repeated with the exception that the epoxy coated fiber was 0.001 inch in diameter. Upon being contacted with boron trifluoride the resin polymerized through its entire diameter and formed a solid cross-linked resin coated glass fiber.

The preceding examples are intended solely to illustrate the practice of my invention and to demonstrate results secured thereby. These examples are not intended to unduly limit the invention which is intended to define only by the steps and their obvious equivalents set forth in the following claims.

I claim:

1. A method for forming extruded shapes of epoxy resins having thicknesses greater than about 0.001 inch which are cured by contacting of the resin with gaseous epoxy curing agents selected from the class consisting of halogens, hydrogen halides, boron halides, silicon halides and nitrogen oxides which comprises:
    (1) admixing an extrudable mass comprising an epoxy prepolymer with an amount from 0.1 to 25.0 weight percent of a complexing agent which complexes with said gaseous epoxy curing agents by donating a pair of electrons thereto to form a coordinate covalent bond with said gaseous epoxy curing agents;
    (2) extruding the resulting mixture through a shaping die to form said extruded shape; and
    (3) contacting said extruded shape with said gaseous curing agent to thereby cure harden the entire thickness of said extruded shape of said epoxy prepolymer.

2. The method of claim 1 wherein the gaseous curing agent is boron trifluoride.

3. The method of claim 1 wherein the complexing agent is dioxane and has a concentration of 0.2 to 10 weight percent.

4. The method of claim 1 wherein the epoxy resin prepolymer is a condensation polymer of epichlorohydrin and bis-(4-hydroxyphenyl)-2,2 propane.

5. The method of claim 1 wherein a filler material is admixed with the epoxy resin prepolymer prior to extruding said prepolymer.

6. The method of claim 5 wherein the filler material is silica and has a concentration of 1.0 to 10 percent by weight.

7. The method of claim 1 wherein said epoxy resin prepolymer is extruded into contact with the gaseous curing agent.

8. The method of claim 7 wherein the gaseous curing agent is maintained at the ambient temperature.

9. The method of claim 1 wherein the epoxy resin prepolymer is liquid at the ambient temperature.

References Cited by the Examiner

UNITED STATES PATENTS

| | | | |
|---|---|---|---|
| 2,506,486 | 5/1950 | Bender et al. | 260—47 |
| 2,602,075 | 7/1952 | Carpenter et al. | 260—47 |
| 2,774,110 | 12/1956 | Walters | 264—184 |
| 2,892,808 | 6/1959 | Shafer | 260—47 |
| 2,935,488 | 5/1960 | Phillips et al. | 260—47 |
| 2,955,907 | 10/1960 | Kolb | 264—184 |
| 3,009,764 | 11/1961 | Urs | 264—184 |
| 3,041,195 | 6/1962 | Saewert et al. | 117—62.2 |
| 3,054,142 | 9/1962 | Hinderer et al. | 264—236 |
| 3,119,711 | 1/1964 | Starmann et al. | 117—62.2 |
| 3,139,657 | 7/1964 | Maly | 260—47 |

OTHER REFERENCES

"Epoxy Resins," Lee et al., McGraw-Hill Book Co. Inc., New York, 1957, pp. 111–113, 141 to 163.

ROBERT F. WHITE, *Primary Examiner*.

ALEXANDER H. BRODMERKEL, *Examiner*.